United States Patent
Levinson et al.

(10) Patent No.: US 7,332,234 B2
(45) Date of Patent: *Feb. 19, 2008

(54) OPTOELECTRONIC DEVICE CAPABLE OF PARTICIPATING IN IN-BAND TRAFFIC

(75) Inventors: Frank H. Levinson, Palo Alto, CA (US); Mark Farley, Napa, CA (US)

(73) Assignee: Finisar Corporation, Sunnyvale, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 11/231,559

(22) Filed: Sep. 21, 2005

(65) Prior Publication Data

US 2006/0018664 A1    Jan. 26, 2006

Related U.S. Application Data

(63) Continuation of application No. 10/003,959, filed on Nov. 14, 2001, now Pat. No. 6,975,642.

(60) Provisional application No. 60/323,394, filed on Sep. 17, 2001.

(51) Int. Cl.
    *B32B 9/00* (2006.01)
(52) U.S. Cl. .................. 428/692; 370/217; 370/218; 370/230; 370/248; 370/252; 370/445; 398/43; 398/44; 398/45; 398/46; 398/47; 398/48; 398/49; 398/50; 398/51; 398/52; 398/53; 398/54; 398/55; 398/56; 398/57; 398/58; 398/135; 398/136; 398/138
(58) Field of Classification Search ........ 370/217–218, 370/230, 248, 252, 445; 398/43–56, 135, 398/136, 138; 428/652
See application file for complete search history.

(56) References Cited

U.S. PATENT DOCUMENTS

| | | | |
|---|---|---|---|
| 4,359,553 A | 11/1982 | Edwards | |
| 4,378,451 A | 3/1983 | Edwards | |
| 4,687,924 A | 8/1987 | Galvin et al. | |
| 4,734,914 A | 3/1988 | Yoshikawa | |
| 4,747,091 A | 5/1988 | Doi | |
| 4,809,286 A | 2/1989 | Kollanyi et al. | |
| 4,916,707 A | 4/1990 | Rosenkranz | |
| 4,932,038 A | 6/1990 | Windus | |
| 5,019,769 A | 5/1991 | Levinson | |
| 5,039,194 A | 8/1991 | Block et al. | |
| 5,041,491 A | 8/1991 | Turke et al. | |
| 5,268,949 A | 12/1993 | Watanabe et al. | |
| 5,287,375 A | 2/1994 | Fujimoto | |
| 5,334,826 A | 8/1994 | Sato et al. | |
| 5,383,208 A | 1/1995 | Queniat et al. | |
| 5,392,273 A | 2/1995 | Masaki et al. | |
| 5,396,059 A | 3/1995 | Yeates | |
| 5,448,629 A | 9/1995 | Bosch et al. | |
| 5,516,563 A | 5/1996 | Schumann et al. | |
| 5,557,437 A | 9/1996 | Sakai et al. | |
| 5,574,435 A | 11/1996 | Mochizuki | |
| 5,576,877 A | 11/1996 | Aulet et al. | |
| 5,594,748 A | 1/1997 | Jabr | |
| 5,604,758 A | 2/1997 | AuYeung et al. | |
| 5,673,282 A | 9/1997 | Wurst | |
| 5,748,672 A | 5/1998 | Smith et al. | |
| 5,761,216 A | 6/1998 | Sotome et al. | |
| 5,801,866 A | 9/1998 | Chan et al. | |
| 5,812,572 A | 9/1998 | King et al. | |
| 5,854,704 A | 12/1998 | Grandpierre | |
| 5,926,303 A | 7/1999 | Giebel et al. | |
| 5,953,690 A | 9/1999 | Lemon et al. | |
| 5,956,168 A | 9/1999 | Levinson et al. | |
| 5,966,395 A | 10/1999 | Ikeda | |
| 6,049,413 A | 4/2000 | Taylor | |

(Continued)

FOREIGN PATENT DOCUMENTS

EP    0745868 B1    4/2002

(Continued)

OTHER PUBLICATIONS

*LXT16706/16707 SerDes Chipset*, Intel Products, www.intel.com/design/network/products/optical/phys/lxtl6706.htm, Apr. 19, 2002.

(Continued)

*Primary Examiner*—Leszek Kiliman

(74) *Attorney, Agent, or Firm*—Workman Nydegger

(57) ABSTRACT

An optoelectronic device that has a network address (e.g., IF address) and participates in in-band traffic for purposes of performing functions (e.g., network diagnostics, network control, network provisioning, fault isolation, etc.) that are traditionally performed by host equipment. An embodiment of the invention may have a protocol engine and a status monitoring module. The protocol engine identifies data packets that are addressed to the optoelectronic device, and allows the optoelectronic device to insert packets of information generated by the device into in-band data. Logic of the optoelectronic device may modify the operating parameters of the device according to the control information included in the data packets. The status monitoring module detects the device's physical conditions and the conditions of its links. Status information generated by the status monitoring module may be incorporated into in-band data by the protocol engine such that the status information may be communicated to a host device or a remote device.

13 Claims, 12 Drawing Sheets

U.S. PATENT DOCUMENTS

| | | | |
|---|---|---|---|
| 6,055,252 A | 4/2000 | Zhang | |
| 6,064,501 A | 5/2000 | Roberts et al. | |
| 6,157,022 A | 12/2000 | Meada et al. | |
| 6,160,647 A | 12/2000 | Gilliland et al. | |
| 6,175,434 B1 | 1/2001 | Feng | |
| 6,188,059 B1 | 2/2001 | Nishlyama et al. | |
| 6,198,558 B1 | 3/2001 | Graves et al. | 398/135 |
| 6,205,505 B1 | 3/2001 | Jau et al. | |
| 6,222,660 B1 | 4/2001 | Traa | |
| 6,229,788 B1 | 5/2001 | Graves et al. | 370/230 |
| 6,256,127 B1 | 7/2001 | Taylor | |
| 6,292,497 B1 | 9/2001 | Nakano | |
| 6,313,459 B1 | 11/2001 | Hoffe et al. | |
| 6,423,963 B1 | 7/2002 | Wu | |
| 6,473,224 B2 | 10/2002 | Dugan et al. | |
| 6,512,617 B1 | 1/2003 | Tanji et al. | |
| 6,519,255 B1 | 2/2003 | Graves | 398/135 |
| 6,526,076 B2 | 2/2003 | Cham et al. | |
| 6,570,149 B2 | 5/2003 | Maruyama et al. | |
| 6,594,050 B2 | 7/2003 | Jannson et al. | 398/54 |
| 6,631,146 B2 | 10/2003 | Pontis et al. | |
| 6,643,472 B1 | 11/2003 | Sakamoto et al. | |
| 6,661,836 B1 | 12/2003 | Dalal et al. | |
| 6,694,462 B1 | 2/2004 | Reis et al. | |
| 6,748,181 B2 | 6/2004 | Miki et al. | |
| 6,937,949 B1 | 8/2005 | Fishman et al. | |
| 6,941,077 B2 | 9/2005 | Aronson et al. | |
| 6,952,531 B2 | 10/2005 | Aronson et al. | |
| 6,975,642 B2* | 12/2005 | Levinson et al. | 370/445 |
| 7,020,567 B2 | 3/2006 | Fishman et al. | |
| 7,058,310 B2 | 6/2006 | Aronson et al. | |
| 2001/0046242 A1 | 11/2001 | Kawakami et al. | |
| 2001/0046243 A1 | 11/2001 | Schie | |
| 2002/0021468 A1 | 2/2002 | Kato et al. | |
| 2002/0027688 A1 | 3/2002 | Stephenson | |
| 2002/0060824 A1 | 5/2002 | Liou et al. | |
| 2002/0097468 A1 | 7/2002 | Mecherle et al. | |
| 2002/0101641 A1 | 8/2002 | Kurchuk | |
| 2002/0105982 A1 | 8/2002 | Chin et al. | |
| 2002/0129379 A1 | 9/2002 | Levinson et al. | 725/129 |
| 2002/0149821 A1 | 10/2002 | Aronson et al. | |
| 2002/0181519 A1 | 12/2002 | Vilhelmsson et al. | |
| 2002/0181894 A1 | 12/2002 | Gilliland et al. | |
| 2003/0110509 A1 | 6/2003 | Levinson et al. | 725/119 |
| 2003/0113118 A1 | 6/2003 | Bartur | |
| 2003/0169790 A1 | 9/2003 | Chieng et al. | |
| 2003/0210917 A1 | 11/2003 | Stewart et al. | |
| 2004/0076113 A1 | 4/2004 | Aronson et al. | |
| 2004/0120720 A1 | 6/2004 | Chang et al. | |
| 2004/0153931 A1 | 8/2004 | Fishman et al. | |
| 2004/0202210 A1 | 10/2004 | Thornton | |
| 2004/0240886 A1 | 12/2004 | Aronson et al. | |
| 2004/0253003 A1 | 12/2004 | Farmer et al. | |
| 2005/0031352 A1 | 2/2005 | Light et al. | |
| 2005/0058455 A1 | 3/2005 | Hosking et al. | |

FOREIGN PATENT DOCUMENTS

| | | |
|---|---|---|
| EP | 02704344 | 10/2004 |
| EP | 04017254 | 10/2004 |
| EP | 1471671 A2 | 12/2004 |
| JP | 58140175 A | 8/1983 |
| JP | 62124576 A | 6/1987 |
| JP | 62235975 A | 10/1987 |
| JP | 62281485 A | 12/1987 |
| JP | 402102589 A | 4/1990 |
| JP | 404023373 A | 1/1992 |
| JP | 06209209 A | 7/1994 |
| JP | 09162811 A | 6/1997 |
| WO | WO 98/00893 | 1/1998 |
| WO | WO 98/00943 | 8/1998 |
| WO | PCT/US02/03226 | 5/2002 |
| WO | WO 02/063800 A1 | 8/2002 |
| WO | WO2004/098100 | 11/2004 |

OTHER PUBLICATIONS

*LXT35401 XAUI-to-Quad 3.2G Transceiver*, Intel Products, www.intel.com/design/network/products/optical/phys/lxt35401.htm, Apr. 19, 2002.

Texas Instruments User's Guide, *TLK2201 Serdes EVM Kit Setup and Usage*, Mixed Signal DSP Solutions, Jul. 2000.

Texas Instruments User's Guide, *TLK1501 Serdes EVM Kit Setup and Usage*, Mixed Signal Products, Jun. 2000.

National Semiconductor DS92LV16 Design Guide, *Serializing Made Simple*, Feb. 2002.

Vaishali Semiconductor, *Fibre Channel Transceiver*, VN16117, MDSN-0002-02, Aug. 9, 2001.

Fairchild Semiconductor, Application Note 77, *CMOS, the Ideal Logic Family*, Jan. 1983.

Analog Target Specification, Annex 48B, Published by IEEE New York, May 2001, pp. 6-14.

Yi Cai et al., "Jitter testing for gigabit serial communication transceivers," Jan.-Feb. 2002, IEEE Design and Test of Computers, vol. 19, Issue 1, pp. 66-74.

Maeda, Noriyuki "Notification of Reason(s) for Refusal," Japanese Patent Application No. JP2002-563630, Nakamura, M. et al., Jul. 13, 2005.

Finisar Corp., "App. Note AN-2025: Using the Finisar GBIC I²C Test Diagnostics Port," 1998.

Hausdorf, Reiner, "Mobile Transceiver Measurements with Radiocommunication Service Monitor CMS," News from Rohde & Schwarz, 127, IV, 1989, pp. 4-7.

Webopedia: The 7 Layers of the OSI Model [online] [retrieved Oct. 15, 2003]. Retrieved from Internet: URL: http://webopedia.internet.com/quick_ref/OSI_Layers.asp.

Webopedia.com: Public-Key Encryption [online] [retrieved Oct. 15, 2003]. Retrieved from Internet: URL: http://www.webopedia.com/TERM/p/public_key_cryptography.html.

Webopedia.com: MAC Address [online] [retrieved Oct. 15, 2003]. Retrieved from Internet: URL: http://www.webopedia.com/TERM/M/MAC_address.html.

Webopedia.com: 12C [online] [retrieved Nov. 11, 2003]. Retrieved from Internet: URL:http://www.webopedia.com/TERM/I/12C.html.

Manchester Encoding [online] [retrieved Nov. 12, 2003]. Retrieved from Internet: URL:http://www.erg.abdn.ac.uk/users/gorry/course/phy-pages/man.html.

Documentation entitled "IR Receiver ASSP: T2525", copyright 2003 by Atmel Corporation.

Documentation entitled "IR Receiver for Data Communication: U2538B", copyright 2003 by Atmel Corporation.

Documentation entitled "Low-Voltage Highly Selective IR Receiver IC: T2527", copyright 2002 by Atmel Corporation.

Documentation entitled "Application Note: T2525/26/27", copyright 2003 by Atmel Corporation.

*Optiport SFF BiDi-Transceiver 100 Mbit/s, 1310 nm Tx/1550 nm Rx*, Infineon Technologies, Jun. 22, 2004, pp. 1-14.

* cited by examiner

OPTOELECTRONIC DEVICE CAPABLE OF PARTICIPATING IN IN-BAND TRAFFIC

CROSS-REFERENCE TO RELATED APPLICATIONS

This application is a continuation, and claims the benefit, of U.S. patent application Ser. No. 10/003,959, entitled OPTOELECTRONIC DEVICE CAPABLE OF PARTICIPATING IN IN-BAND TRAFFIC, filed Nov. 14, 2001, now U.S. Pat. No. 6,975,642 which, in turn, claims the benefit U.S. Provisional Patent Application No. 60/323,394, filed Sep. 17, 2001. All of the foregoing patent applications are incorporated herein in their respective entireties by this reference.

BACKGROUND OF THE INVENTION

1. The Field of the Invention

The present invention relates generally to optoelectronic devices. More particularly, the present invention relates to an optoelectronic transceiver, transmitter or receiver having a network address and capable of participating in in-band traffic.

2. The Relevant Technology

FIG. 1 shows a schematic representation of the essential features of a typical prior-art fiber optic transceiver. The main circuit 1 contains at a minimum transmit and receiver circuit paths and power 19 and ground connections 18. The receiver circuit typically consists of a Receiver Optical Subassembly (ROSA) 2 which contains a mechanical fiber receptacle as well as a photodiode and pre-amplifier (preamp) circuit. The ROSA is in turn connected to a post-amplifier (postamp) integrated circuit 4, the function of which is to generate a fixed amplitude digital signal that is connected to outside circuitry via the RX+ and RX− pins 17. The postamp circuit also often provides a digital output signal known as Signal Detect or Loss of Signal indicating the presence or absence of suitably strong optical input. The Signal Detect output is provided as an output on pin 20. The transmit circuit will typically consist of a Transmitter Optical Subassembly (TOSA) 3 and a laser driver integrated circuit 5. The TOSA contains a mechanical fiber receptacle as well as a laser diode or LED. The laser driver circuit 5 will typically provide AC drive and DC bias current to the laser. The signal inputs for the driver are obtained from the TX+ and TX− pins 12. Typically, the laser driver circuitry will require individual factory setup of certain parameters such as the bias current (or output power) level and AC modulation drive to the laser. Typically, this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6, 8.

The TX disable pin 13 allows the transmitter to be shut off by the host device, while the TX fault pin 14 is an indicator to the host device of some fault condition existing in the laser or associated laser driver circuit. In addition, the optoelectronic device 1 may include an optional eye-safety integrated circuit 11 that performs functions aimed at preventing non-eyesafe emission levels when a fault condition exists in the laser circuit. Also shown in FIG. 1 is an EEPROM 10 for storing standardized serial ID information that can be read out via a serial interface (e.g., using the serial interface of the A TMEL A T24COIA family of EEPROM products) consisting of a clock 15 and data 16 line.

The signal pins described above collectively provide an electrical interface between the optoelectronic device 1 and the host device. The optoelectronic transceiver industry over the years has standardized one such interface, known as the GBIC standard. An advantage of the GBIC standard is its relative simplicity and the low production cost of the integrated circuits required for implementation. Another advantage is that the size of the transceiver can be quite compact.

One disadvantage of the GBIC standard, however, is that the transceiver is reliant on the host device to perform a variety of operations such as reset and shutdown. If the host device malfunctions, the transceiver attached to it may not be able to perform these operations properly. Another disadvantage of the GBIC standard is its inflexibility. It is difficult to implement functionality in addition to those described in the GBIC standard.

Accordingly, there is a need for a highly flexible interface between an optoelectronic device and a host device.

BRIEF SUMMARY OF THE INVENTION

An embodiment of the present invention is an optoelectronic device that has an assigned network address (e.g., Internet Protocol address) and participates in in-band traffic for purposes of performing functions (e.g., network diagnostics, network control, network provisioning, fault isolation, etc.) that are traditionally performed by host equipment. An optoelectronic device can be an optoelectronic transceiver, an optoelectronic transmitter, or an optoelectronic receiver.

In one embodiment, the optoelectronic device includes a protocol engine and a status monitoring module. The protocol engine identifies data packets that are addressed to the optoelectronic device, and allows the optoelectronic device to insert packets of information generated by the device into in-band data. Logic of the optoelectronic device may modify the operating parameters of the device according to the control information included in the data packets. The status monitoring module detects the device's physical conditions and the conditions of its links. Status information generated by the status monitoring module may be incorporated into the in-band data by the protocol engine such that the status information may be communicated to a host device or a remote device. The protocol engine is programmable to communicate in various network protocols and to perform a variety of operations. Thus, additional functionality may be added to the optoelectronic device without altering the interface through which the device communicates with the host.

In one embodiment, the optoelectronic device includes an input/output (I/O) interface for coupling to a host device, and an optical output interface for coupling to an optical medium, such as an optical fiber. Through the I/O interface, the optoelectronic device may receive a stream of data that includes data packets. Some of the data packets may have destination addresses matching the predefined address assigned to the optoelectronic device. Circuits of the optoelectronic device identify such data packets and process the information (data and/or commands) included in the identified data packets. The identified data packets may be removed from the data stream before the data stream is converted into optical signals. The optoelectronic device may also include an optional local module 110 interface through which the device can communicate with the host or with another optoelectronic device coupled to the host.

The optoelectronic device may include an optical input interface. Through the optical input interface, the optoelectronic device is configured for receiving a data stream that includes data packets, some of which may be addressed to the optoelectronic device. Circuits of the optoelectronic device identify such data packets and process the information included in the identified data packets. The optoelectronic device may remove the identified data packets from the data stream before the data stream is communicated to the host device.

The optoelectronic device may generate new data packets in response to information included in the identified data packets, or in response to the occurrence of a predefined event. The new data packets may also be generated periodically. The new data packets may be communicated to the host device via the input/output interface, or to a remote device whose address is defined by the identified data packets via a computer network. In other embodiments, the optoelectronic device may be configured to send the new data packets to any predefined device or devices via a network.

The status monitoring module may include sensors for detecting the physical conditions of the optoelectronic device and/or the conditions of the optical medium. The detected information may be incorporated into data packets generated by the protocol engine. The data packets generated by the protocol engine may be addressed to the host device and/or to any device coupled to the optoelectronic device via a network. In this way, the optoelectronic device is capable of reporting its conditions and/or the conditions of its optical links to the host computer or to any remote device in the network.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 2A:
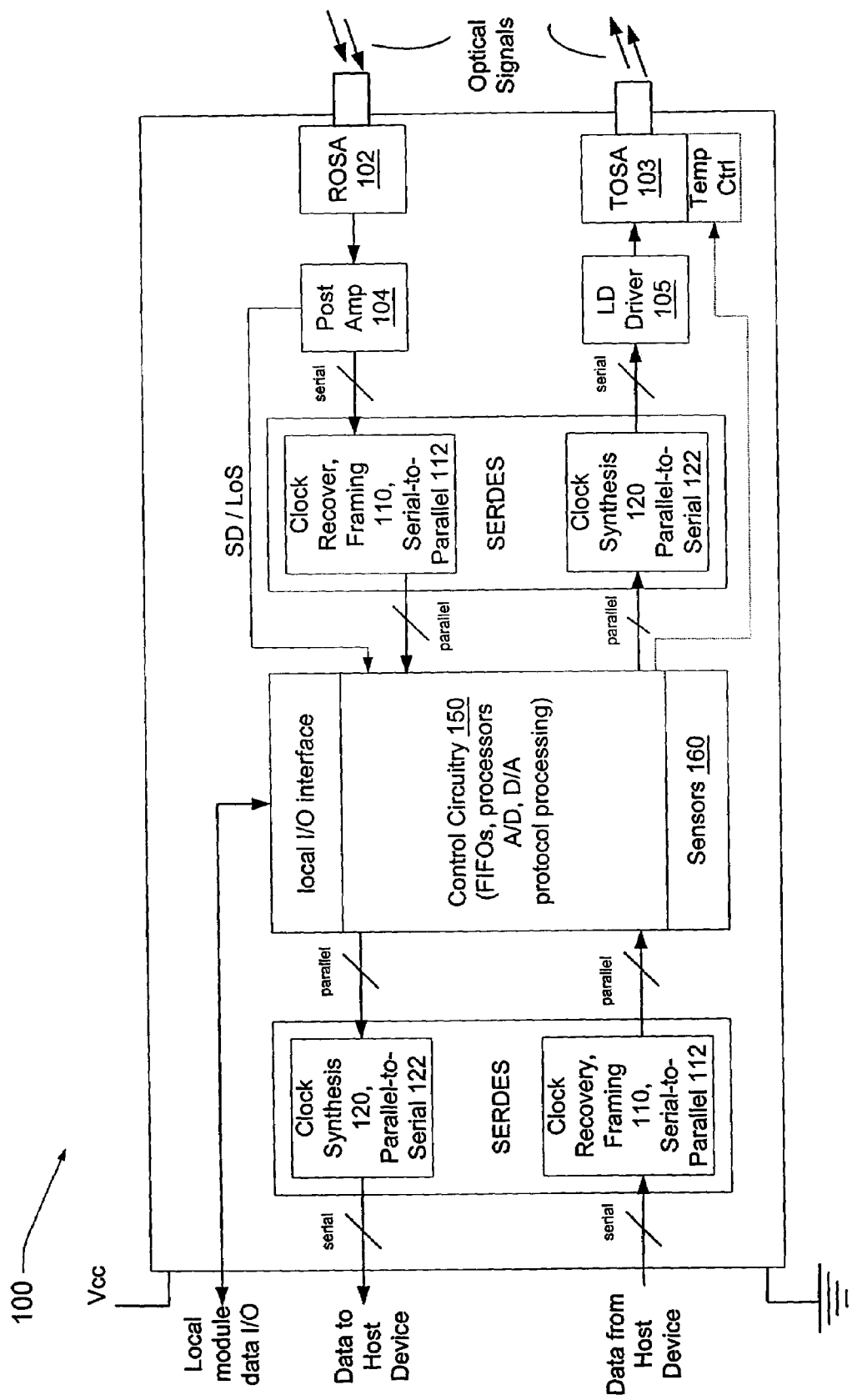
FIG. 2A is a block diagram depicting an optoelectronic transceiver in accordance with one embodiment of the present invention.

FIG. 2A shows a schematic representation of a fiber optic transceiver 100 in accordance with an embodiment of the present invention. Transceiver 100 includes a Receiver Optical Subassembly (ROSA) 102, which contains a mechanical fiber receptacle as well as a photodiode and a pre-amplifier (preamp) circuit. ROSA 102 is in turn connected to a post-amplifier (postamp) integrated circuit 104, the function of which is to take relatively small signals from ROSA 102 and amplify and limit them to create a uniform amplitude digital electronic output. The postamp circuit 104 provides a digital output signal known as Signal Detect or Loss of Signal indicating the presence or absence of suitably strong optical input.

The transmit circuitry of transceiver 100 consists of a Transmitter Optical Subassembly (TOSA) 103 and a laser driver integrated circuit 105. TOSA 103 contains a mechanical fiber receptacle as well as a laser diode or LED. Laser driver circuit 105 provides AC drive and DC bias current to the laser. The signal inputs for the driver are obtained from I/O pins (not shown) of transceiver 100.

SERDES (SERializing and DESerializing) circuits are incorporated within the transceiver 100. SERDES circuits serve the function of converting parallel data to serial data and vice versa. In the illustrated embodiment, ROSA 102 is coupled to SERDES circuitry that includes framing and serial-to-parallel converter circuits 110 and clock recovery circuit 112. TOSA 103 is coupled to SERDES circuitry that includes parallel-to-serial converter circuit 120 and high-speed clock synthesizer circuit 122.

Also contained in transceiver 100 is control circuitry 150, which may include one or more integrated circuits configured for controlling the operations of the transceiver 100. Control circuitry 150 is coupled to provide control signals to ROSA 102, TOSA 103, post-amplifier 104, and laser driver 105, while these components provide feedback signals back to control circuitry 150. For example, control circuitry 150 provides signals to control the bias current level and AC modulation of laser driver circuit 105, while post-amplifier circuit 104 provides a Signal Detect output to control circuitry 150 to indicate the presence or absence of a suitably strong optical input. Other control functions, such as temperature compensation of laser driver circuit 105, may also be carried out by the control circuitry 150. Temperature and/or other physical conditions of various components of transceiver 100 may be acquired using sensors 160 that are coupled to control circuitry 150. In some embodiments, conditions of the optical links may be also be acquired using sensors 160. In some embodiments, the control circuitry may include one or more programmable microcontrollers and/or microprocessors.

In addition to, and sometimes in conjunction with these basic control functions, there are a number of other tasks that may be handled by control circuitry 150. These tasks include, but are not necessarily limited to, the following:

Setup functions. These generally relate to the required adjustments made on a part-to-part basis in the factory to allow for variations in component characteristics such as laser diode threshold current.

Identification. This refers to the storage of an identity code within a general purpose memory (e.g., an EEPROM). In a preferred embodiment of the present invention, the identity code is stored in the form of an IP (Internet Protocol) address. Additional information, such as subcomponent revisions and factory test data, may also be stored within the general purpose memory for purposes of identification.

Eye safety and general fault detection. These functions are used to identify abnormal and potentially unsafe operating parameters and to report these to the user and/or perform laser shutdown, as appropriate. Sensors 160 may be used to identify such abnormal or potentially unsafe operating parameters.

Receiver input optical power measurement. This function is used to measure the input optical power such that a suitable signal amplification level can be set.

Laser diode drive current. This function is used to set the output optical power level of the laser diode.

Laser diode wavelength control. This function is used to set the wavelength of light emitted by the laser diode. This feature is critical in Dense Wave Division Multiplexing (DWDM) systems. The wavelength of the light emitted by the laser diode, in some embodiments, may be changed by adjusting the temperature of the laser diode.

Laser diode temperature monitoring and control. In one embodiment, an optional temperature controller (e.g., a thermal-electric cooler) may be disposed in or near TOSA 103 for controlling the temperature of the laser diode. In that embodiment, control circuitry 150 is also responsible for providing control signals to the temperature controller.

Note that transceiver 100 is configured for coupling to a host device. As used herein, a host device refers to a link card to which a transceiver is attached and/or a host system computer to which a transceiver provides an optical connection. Host systems may be computer systems, network attached storage (NAS) devices, storage area network (SAN) devices, optoelectronic routers, as well as other types of host systems and devices. Transceiver 100 can be attached to a host device through a serial interface.

With reference still to FIG. 2A, control circuitry 150 is configured to receive de-serialized data from serial-to-parallel converter circuit 110. The de-serialized data are processed by control circuitry 150 before they are converted into serial data and transmitted to the host device. Specifically, control circuitry 150 monitors the stream of data that it receives from serial-to-parallel converter circuit 110 (an "inbound" data stream) and determines whether the data contains any information intended to be communicated to the transceiver 100. If such information is identified, control circuitry 150 retrieves the information from the "inbound" data stream and performs operations according to the identified information. In response to the identified information, control circuitry 150 may modify the "inbound" data stream by removing the identified data packets and/or by inserting new data packets in the data stream.

In this document, the term "data packet" is used broadly to mean all packets of information transmitted over a data path. Thus, "data packets" includes protocol packets, packets having only command information, and the like, as well as packets containing data being transmitted over a data channel.

For the purposes of illustration, assume that transceiver 100 is assigned an IP address, and transceiver 100 is configured for coupling to an IP network. The data stream that passes through control circuitry 150 will include data packets each having a packet header and a destination, address. Data packets having a destination address matching the IP address assigned to transceiver 100 are retrieved from the data stream by control circuitry 150. These data packets may include, within their payload portions, commands to report the transceiver's current status information to the host device or to a specific IP address, for example. In another example, these data packets may include commands to adjust the bias level of laser driver 105, or adjust the wavelength of the emitted light. Control circuitry 150, upon processing these data packets, will perform the indicated operations. Data packets that are not addressed to transceiver 100 will pass through unmodified.

In some embodiments of the invention, the control circuitry 150 is configured to receive an "outbound" data stream from the host device. In this embodiment, "outbound" serial data from the host device are de-serialized by SERDES circuits before they are transmitted to the control circuitry 150. Control circuitry 150 monitors the de-serialized "outbound" data stream and determines whether the data stream contains any information intended to be communicated to the transceiver. If such information is identified, control circuitry 150 retrieves the information from the "outbound" data stream and performs operations according to the identified information. In response to the identified information, control circuitry may modify the "outbound" data stream by removing the identified data packets and/or by inserting new data packets in the data stream. The "outbound" data stream is then provided to parallel-to-serial converter circuit 120 to be serialized and subsequently converted to optical signals by TOSA 103.

In some embodiments of the present invention, control circuitry 150 is configured to process both "inbound" and "outbound" data streams. In these embodiments, information from one data stream may effect modification of another data stream. For example, from the "outbound" data stream, the transceiver may receive a command to report its operating parameters to the host device. In that event, the transceiver may generate a data packet containing its operating parameters and send the data packet to the host device via the "inbound" data stream. In another example, the transceiver may receive from the "inbound" data stream a command to report its operating parameter to a specified network address. In that event, the transceiver may generate a data packet containing its operating parameters and send the data packet to the specified network address via the "outbound" data stream.

In furtherance of the present invention, transceiver 100 may generate data packets to be communicated to the host device or to a remote device upon the occurrence of a predefined event. For example, when sensors 160 detect an unsafe operating condition, transceiver 100 may attempt an emergency shut down. In that event, transceiver 100 may generate data packet(s) indicating the shut down and send the data packet(s) to the host device and/or a remote device via another network connection of the host. In another example, when sensors 160 detect that the wavelength of light emitted by the laser diode of TOSA 103 has deviated significantly, transceiver 100 may generate a data packet containing a warning signal to the host device or a remote device via another network connection of the host device. In yet another example, when sensors 160 detect that a laser diode of TOSA 103 is exhibiting symptoms known to be predictive of future failure of the laser diode, transceiver 100 may generate a data packet indicating the condition of the laser diode and send the information to the host device and/or remote device. In some embodiments, transceiver 100 may be configured to send data packets containing status information to the host device and/or a specified remote device periodically. In another embodiment, the transceiver 100 may be programmed to send an electronic message (e-mail) to a particular IP address upon encountering an error condition.

In accordance with one embodiment of the invention, transceiver 100 does not communicate exclusively using data packets. Also shown in FIG. 2A is an optional local module input/output (I/O) interface through which the transceiver may communicate with the host device. In this embodiment, transceiver 100 may be configured to transmit its status information (e.g., information generated by sensors 160, Loss of Signal, etc.) and network address to the host device via the local module I/O interface such that the host device can forward the information to another address via the host device's other network connections. Communication via the local I/O module can be used for reporting link failures. For instance, if the optical link coupled to transceiver 100 is interrupted, transceiver 100 may communicate the link's condition and its network address to host device. The host may then forward the link's condition to the network administrator, the party who is responsible for maintaining the link, or a centralized network control system.

Figure 8:
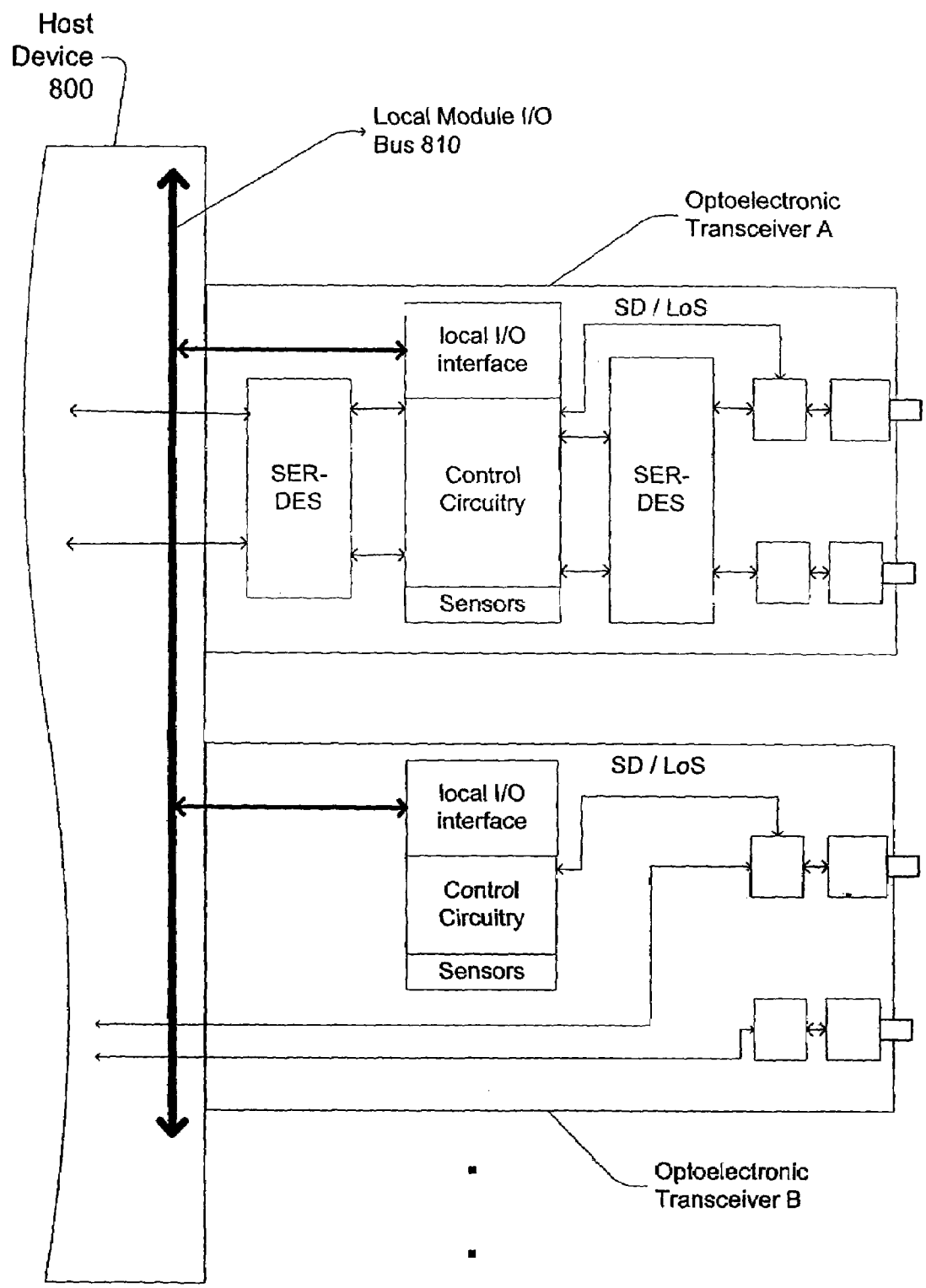
FIG. 8 is a block diagram illustrating a host device that has two optoelectronic transceivers that are capable of communication with each other via a local I/O interface in furtherance of an embodiment of the invention.

Using the local module I/O interface, transceiver 100 can serve as a conduit of information for all optoelectronic devices within the same host. FIG. 8 is a block diagram illustrating such a configuration. As shown in FIG. 8, a host device 800 with two transceivers Transceiver A and Transceiver B coupled thereto includes a local module I/O bus 810 for allowing Transceiver A to communicate with Transceiver B via the local module I/O interface. Status information of Transceiver B may be communicated to Transceiver A via the local module I/O interface such that the status information can be communicated to the host device or a remotely coupled device via in-band data of Transceiver A.

Furthermore, Transceiver A can be a transceiver capable of participating in in-band data communication (e.g., transceiver 100), and Transceiver B may be a transceiver that is not capable of participating in in-band data communication. Multiple transceivers that are not capable of participating in in-band data communication by themselves may be coupled to the host device and may participate in in-band communication through Transceiver A as long as these transceivers are capable of communicating via the local module I/O interface.

Figure 6:
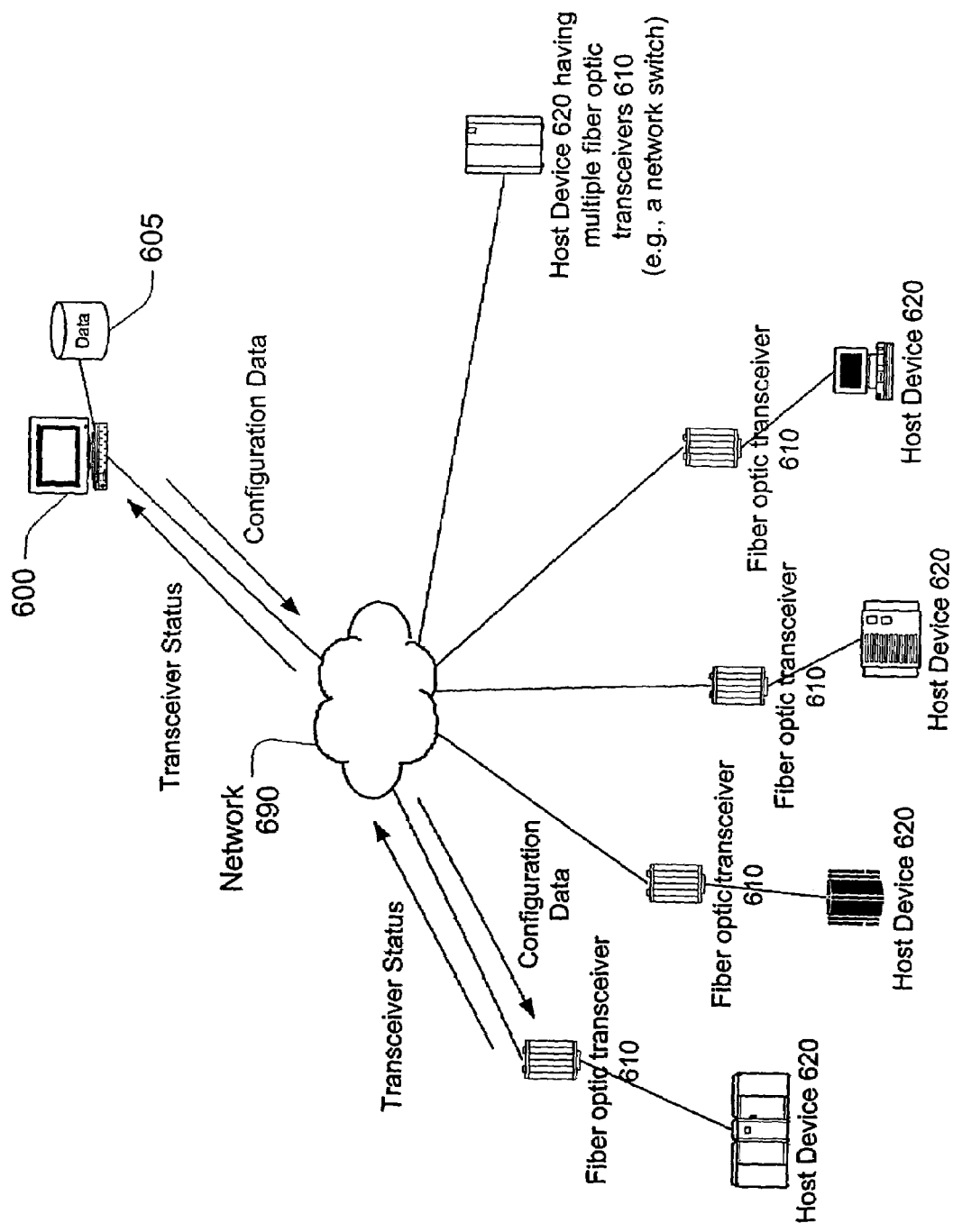
FIG. 6 is a block diagram depicting a network having fiber optic transceivers remotely coupled to a controller system and a database that stores relevant information of the transceivers.

FIG. 6 is a block diagram illustrating a control system 600 coupled to receive status information of multiple transceivers 610 to which the control system 600 is remotely coupled via a packet-switched network 690. Transceivers 610 have IP addresses different from those of their associated host devices 620. The IP addresses of transceivers 610 are stored within a database 605 of the control system 600. The control system 600 may periodically send status update requests to the transceivers 610 in data packets addressed to transceivers 610. The status update requests may include the IP address of the control system 600. Thus, upon receiving the status update requests, the transceivers 610 may respond by sending their status information to the control system 600. A centralized database of transceiver status information may then be maintained by the control system 600.

In furtherance of the present invention, control system 600 may remotely control the operation parameters of transceivers 610. This feature is useful for system administration and enables remote trouble-shooting of transceiver problems. This feature is also useful for centralized control of network parameters and resources, such as transmission wavelengths in a DWDM system.

Figure 3A:
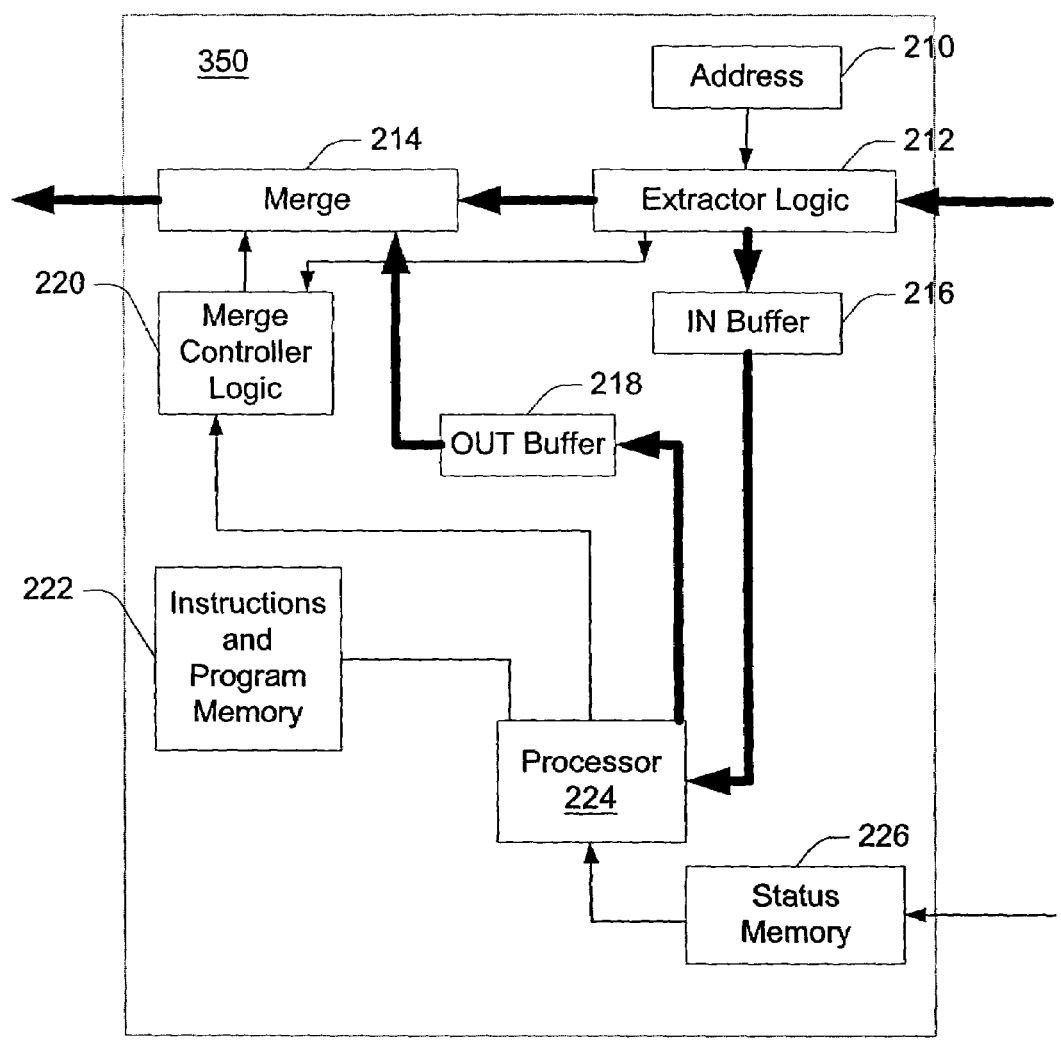
FIG. 3A is a block diagram depicting an implementation of a protocol engine according to one embodiment of the present invention.

Attention now turns to implementation of control circuitry 150. FIG. 3A is a block diagram depicting portions of control circuitry 150 in accordance with one implementation of the present invention. Particularly, a protocol engine 350 that includes an address memory 210, an extractor 212, a merge circuit 214, an IN buffer 216, an OUT buffer 218, a merge controller 220, an instruction and program memory 222, a processor 224, and a sensor data storage 226, is illustrated.

Address memory 210, which may be an EEPROM (Electrically Erasable and Programmable Read Only Memory) or any type of non-volatile memory, stores a network address of the transceiver. The extractor 212 receives a stream of data packets and compares the network address of the transceiver with destination addresses of the data packets received. If there is a match, extractor 212 extracts the matching data packets from the data stream, and stores the extracted data packets within the IN buffer 216. The remaining data packets, which do not have a destination address matching the network address of the transceiver, are passed to merge circuit 214.

Instruction and program memory 222 contains programs and/or instructions, for execution by the processor 224, for decoding and processing data packets addressed to the transceiver, for analyzing data received from the sensors 160, for modifying the operational state of the transceiver (e.g., by modifying the bias applied to the laser diode by laser driver, and/or by activating and deactivating various circuits within the transceiver), and for generating new data packets addressed to the host device or other network device. In one embodiment of the invention, these programs and instructions contained in memory 222 may be modified by the user(s) such that the optoelectronic device may be reprogrammed to communicate in various network protocols and to perform a variety of operations. By altering the program codes contained in memory 222, additional functionality may be added to the optoelectronic device without altering the interface through which it communicates with the host.

With reference still to FIG. 3A, data packets extracted by the extractor 212 are replaced with link idle symbols at the output so that the link is kept active and error free. The extracted data packets are processed by processor 224 in accordance with the program codes stored within memory 220 and/or operational state(s) of the device. In the present embodiment, processor 224 may process the information contained in the data packets in conjunction with instructions stored within instruction and program memory 222 and/or sensor data stored within sensor data storage 226. For example, the extracted data packets may contain an instruction that calls for an operation defined by the program codes stored within the instruction and program memory 222. In another example, the extracted data packets may contain an instruction that instructs the transceiver to obtain sensor data from sensor data storage 226, generate a status report of its current operating conditions and transmit the status report to a specified network address. In yet another example, the extracted data packets may contain new processor instructions to be stored within instructions and program memory 222.

Data packets generated by processor 224 are temporarily stored within OUT buffer 218. Merge circuit 214, under the control of merge circuit controller 220, merges the processor-generated data packets with data packets that are not addressed to the transceiver to form a modified data stream. If processor 224 does not generate any new data packets, the merge circuit forms a modified data stream with the data packets that are not addressed to the transceiver. In the present embodiment, the merge circuit 214 inserts processor-generated data packets into other data packets by monitoring the data stream and replacing a protocol suitable number of link idle symbols with the processor-generated data packets.

Observe that protocol engine 350 of FIG. 3A is configured for processing and modifying one data stream. A fiber optic transmitter or receiver having a single datapath may implement the circuitry of FIG. 3A. A fiber optic transceiver having multiple datapaths may implement one or more instances of the protocol engine 350.

Figure 3B:
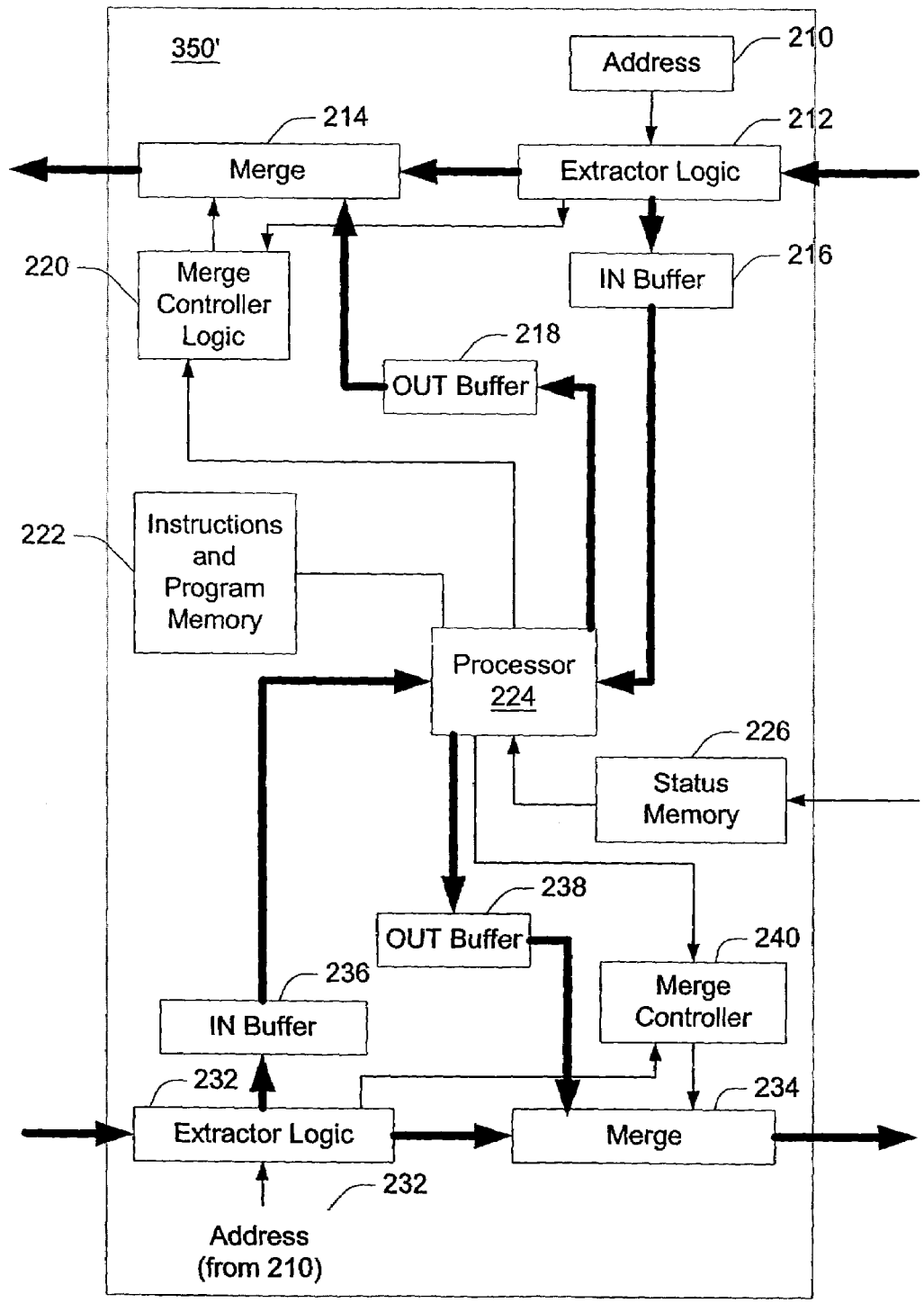
FIG. 3B is a block diagram depicting an implementation of a protocol engine according to another embodiment of the present invention.

FIG. 3B is a block diagram depicting an implementation of a protocol engine 350' for a fiber optic transceiver having two data paths. The control circuitry is configured for processing and modifying more than one data stream. In addition to the control circuitry shown in FIG. 3A, the protocol engine embodiment of FIG. 3B includes a second extractor 232, IN buffer 236, OUT buffer 238 and merge circuit 240. The first set of circuits (212, 214, 216, 218, 220) are used with a first data path (e.g., the inbound data path), while the second set of circuits (232, 234, 236, 238, 240) are used with a second data path (e.g., the outbound data path). Data packets with a destination address matching the network address of the transceiver are extracted from the data streams and processed by processor 224. Data packets generated by processor 224 may be inserted in anyone of the data streams, depending on the intended destination of the processor-generated packets. In this way, a response triggered by a data packet sent by the host device can be directed back to the host device quickly.

Figure 4:
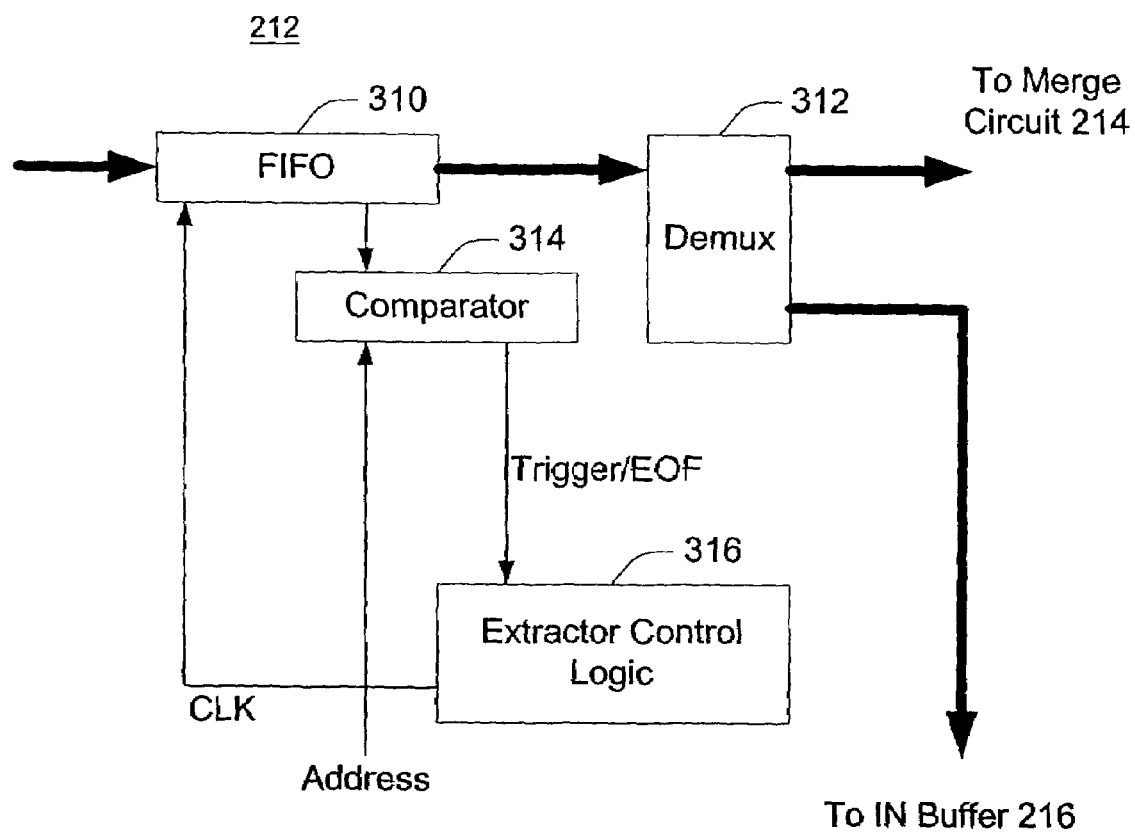
FIG. 4 is a block diagram depicting an implementation of the extractor circuit of FIG. 3.

FIG. 4 is a block diagram depicting an implementation of an extractor circuit 212 in accordance with one embodiment of the present invention. Extractor circuit 212 consists of a FIFO (First In First Out buffer) 310, a demultiplexer (demux) 312, a comparator 314, and extractor control logic 316. FIFO 310 is configured to receive and temporarily store a stream of data packets. While the data packets are progressing through FIFO 310, a comparator examines the destination address bits of each packet, and compares the destination address of each packet with the network address of the transceiver. If a match is found, comparator 314 triggers extractor control logic 316 to send an appropriate signal to the demux 312 such that the matching data packet is diverted to the IN buffer 216. The non-matching data packets are provided to demux 312 to be passed onto merge circuit 214.

The comparator 314 also detects the end of each packet and sends an EOF signal to the extractor control logic 316 when the end of a packet has been conveyed to the IN buffer 216. This helps the extractor control logic 316 to control the diversion of variable length packets to the IN buffer 216, by enabling it to know when the end of such packets have been fully transferred from the FIFO 310 to the IN buffer 216. In an alternate embodiment, all packets addressed to the transceiver (i.e., having a destination address matching the address assigned to the transceiver) are fixed length packets, thereby eliminating the need for end of packet detection circuitry in the comparator 314. In yet another alternate embodiment, the length of each packet addressed to the transceiver is specified in the header of the packet and that length information is extracted (e.g., by the comparator 314 or a parallel circuit) and conveyed to the extractor control logic 316 to enable it to handle the transfer of variable size data packets from the FIFO 310 to the IN buffer 216.

Figure 5:
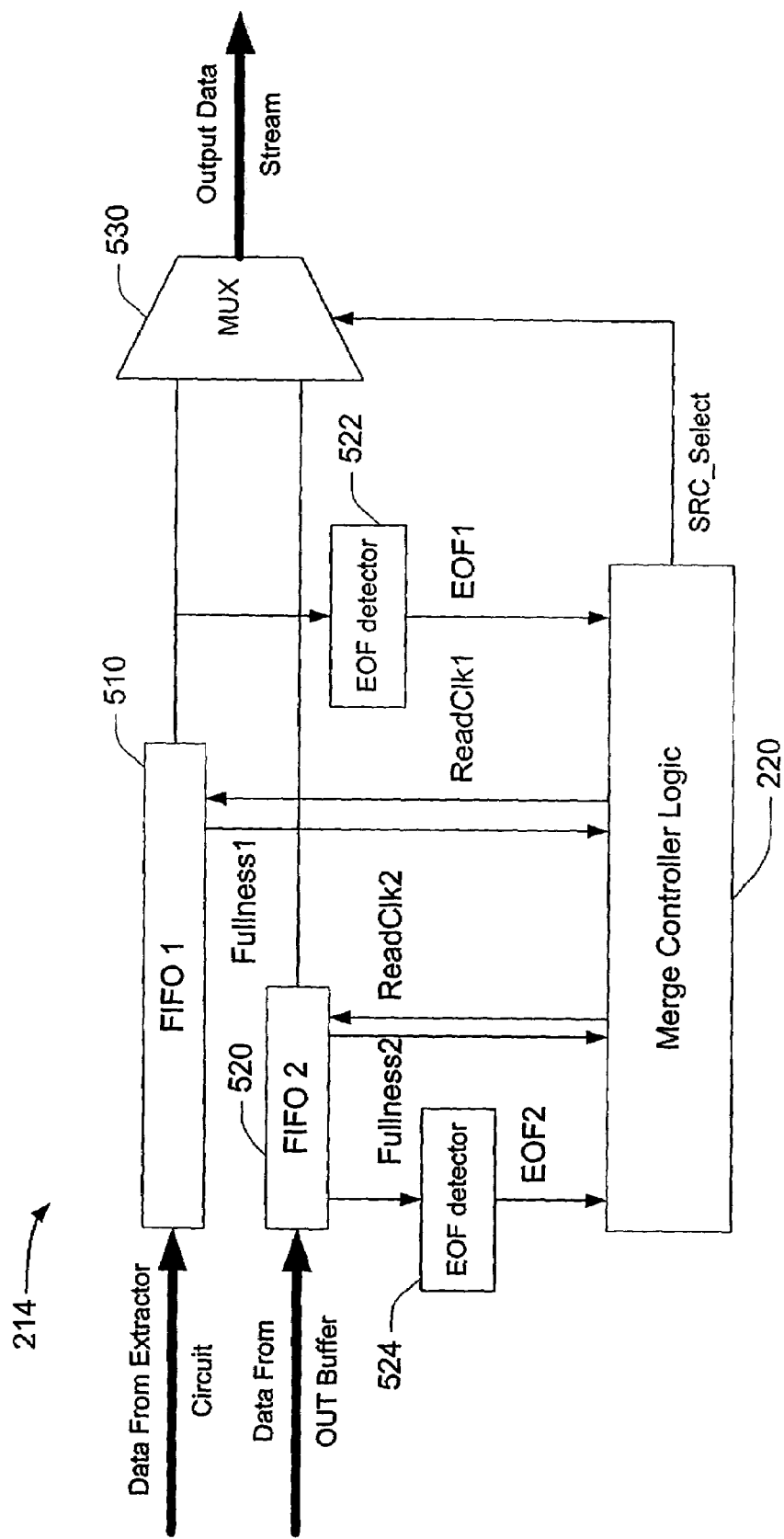
FIG. 5 is a block diagram depicting an implementation of the merge circuit of FIG. 3.

FIG. 5 is a block diagram depicting an implementation of a merge circuit 214 and merge controller logic 220 in accordance with one embodiment of the present invention. Merge circuit 214 consists of FIFO buffers 510, 520 and a multiplexer (mux) 530. FIFO 510 receives a data stream from extractor circuit 510, and FIFO 520 receives a data stream from OUT buffer 218. As mentioned, data contained in OUT buffer 218 are generated by processor 224. The FIFO1 and FIFO2 buffers 510, 520 include circuitry for generating fullness indication signals Fullness1 and Fullness2, respectively, which indicate the fullness of these buffers. The Fullness2 signal indicates when a full packet from the processor 214 (see FIGS. 3A, 3B) is present in FIFO2. The Fullness1 signal indicates when FIFO 1 contains less than a threshold level of data. For example, Fullness1 may indicate when FIFO 1 is at least half empty. Alternately, Fullness1 may indicate when FIFO1 is sufficiently empty to enable transmission of a full data packet from FIFO2 without risking overflow of FIFO 1 by new incoming data. In this regard, it is noted that "filler" signals, sometimes called "idles" or "null data signals," are transmitted on the data paths between data packets, but are not stored in the FIFO's of the transceiver. When data packets are transmitted at less than the maximum transmission rate of the data channel, the FIFO's in the data path become partially or even completely empty.

A first comparator 522 sends an EOFI signal to the merge control logic 316 when the end of packet is transferred from FIFO1 to the Mux 530, and a second comparator 524 sends an EOF2 signal to the merge control logic 316 when the end of packet is transferred from FIFO2 to the Mux 530. Mux 530 selectively outputs data from either FIFO 510 or FIFO 520, depending on the SRC_Select signal generated by merge controller logic 220, which generates the SRC_Select signal based in part on the Fullness1 and Fullness2 signals from the FIFO's 510, 520. When both FIFO1 and FIFO2 are empty, Mux 530 generates and outputs filler signals (e.g., idles) to the output data stream.

In addition to generating the SRC_Select signal, merge controller logic 220 generates clock signals ReadClk1 and ReadClk2 for controlling the outflow of data from FIFO 510 and FIFO 520. In particular, when the Fullness2 signal indicates that a full packet (produced by the data processor 224, FIG. 3A or 3B) is ready for transmission, the Fullness1 signal indicates that FIFO1 is less full than the predefined threshold, and the EOF signal from comparator 522 indicates that the last symbol transferred from FIFO1 to the Mux 530 was the end of a data packet, then the merge control logic 316 stops the outflow of data from FIFO 1 (by deactivating ReadClk1) and enables the outflow of data from FIFO2 (by activating ReadClk2) until a full data packet is transferred from FIFO2 to the Mux 530. When a full data packet has been transferred from FIFO2 to the Mux 530, as indicated by the EOF2 signal, the merge control logic 316 determines whether to next send a data packet from FIFO1 or FIFO2 based on the current status of the Fullness 1 and Fullness2 signals. When both FIFO1 and FIFO2 are empty, a filler signal is sent from either FIFO to the Mux 530, thereby causing the Mux 530 to transmit filler signals until such time that it receives a new data packet from either of the FIFO's.

Figure 7A:
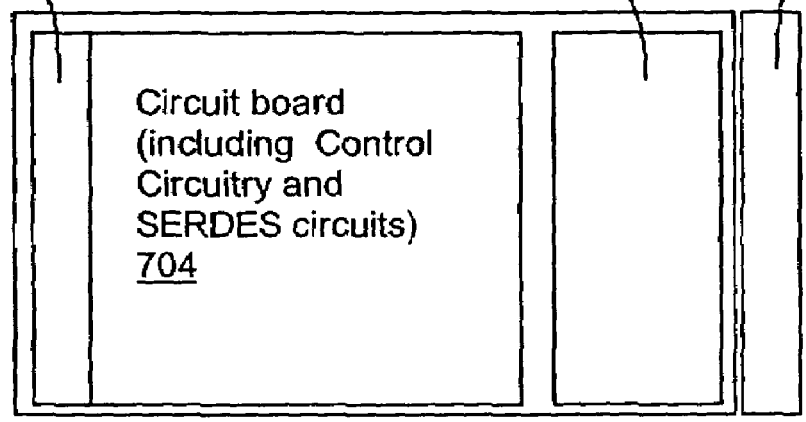
FIG. 7A depicts a top view of an optoelectronic device in accordance with an embodiment of the present invention.
Figure 7B:
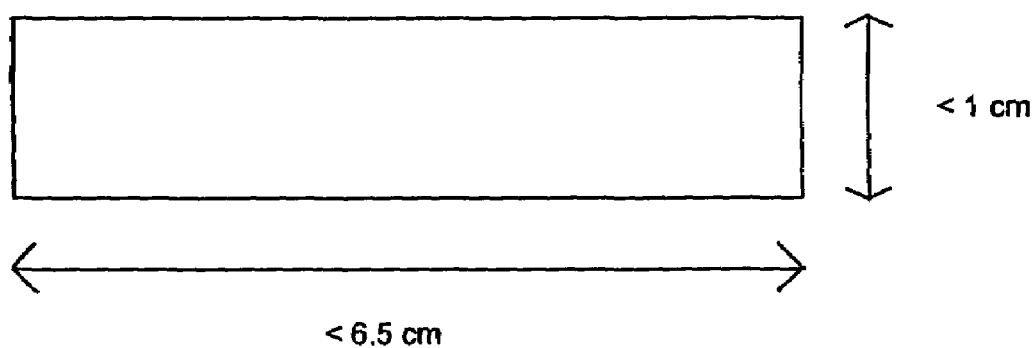
FIG. 7B depicts a side view of the optoelectronic device of FIG. 7A.

FIGS. 7A and 7B illustrate the dimensions of an optoelectronic device 700 that may be constructed in accordance with embodiments of the present invention. FIG. 7A shows a top view of the optoelectronic device 700, and FIG. 7B shows a side view. The physical dimensions of the optoelectronic device 700 are as follows: width, 3 cm or less; length, 6.5 cm or less, and height, 1 cm or less. In an alternate embodiment, the physical dimensions of the optoelectronic device 700 are: width, 0.54 inches or less; length, 2.24 inches or less; and height, 0.34 inches or less. Optoelectronic device 700 includes an electrical interface 702 for coupling to a host device and a circuit board 704 containing SERDES circuits (e.g., clock recovery circuit 112, framing and serial-to-parallel circuit 110, high-speed clock synthesizer circuit 122, parallel-to-serial converter circuit 120, See FIG. 2A) and control circuitry. Note that the SERDES circuits and the control circuit 150 including processors, A/D converters, D/A converters, protocol processing circuits, FIFOs, program memories, etc., may be implemented as a single integrated circuit. Coupled to the circuit board 704 are optical subassemblies 706 (e.g., ROSA 102 and TOSA 103) and the optical connectors 710 for coupling to fiber optic cables.

Figure 2B:
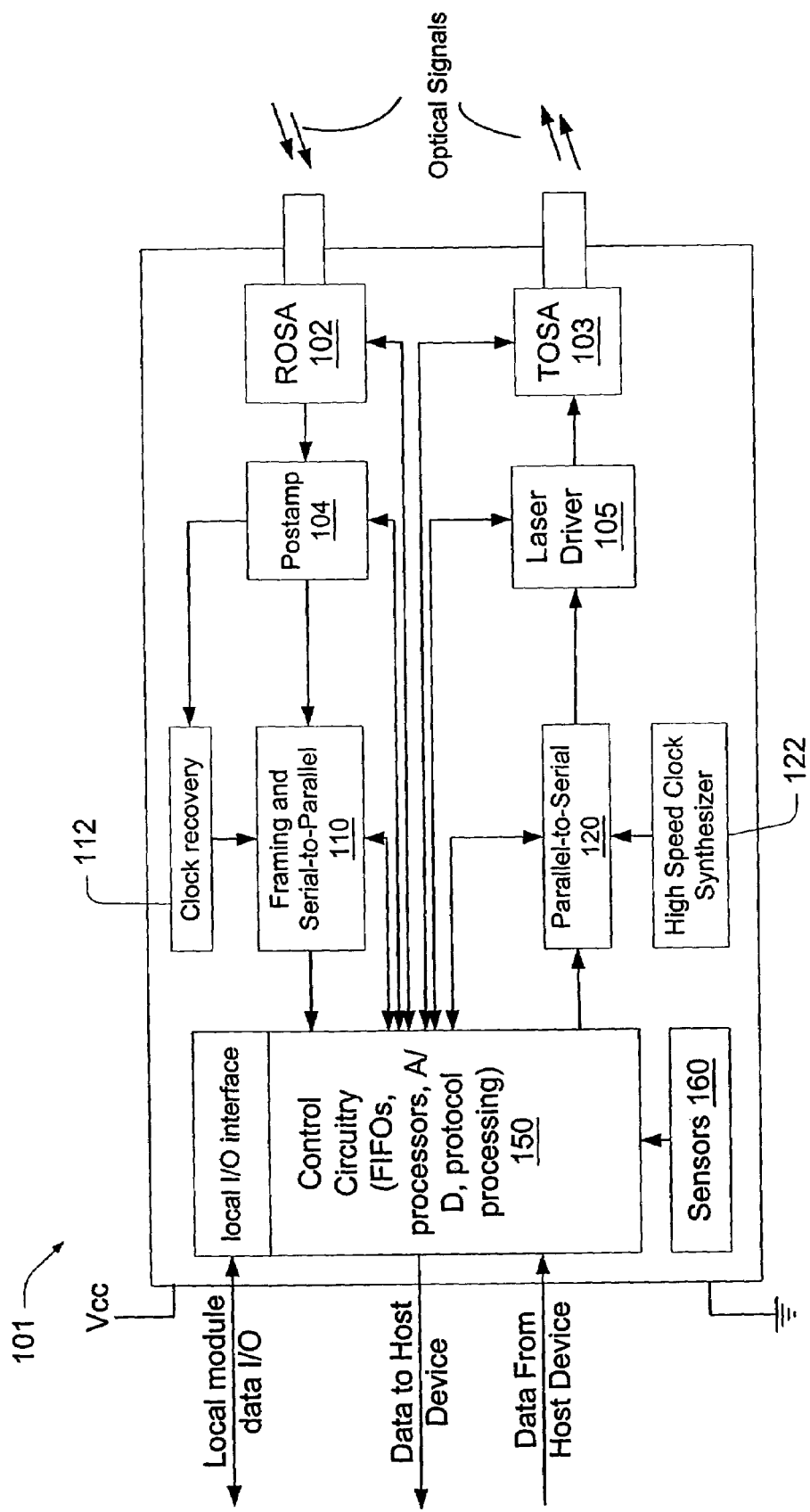
FIG. 2B is a block diagram depicting an optoelectronic transceiver in accordance with another embodiment of the present invention.

Attention now turns to FIG. 2B, which depicts a schematic representation of a fiber optic transceiver 101 in accordance with an alternate embodiment of the present invention. Fiber optic transceiver 101 is similar to fiber optic transceiver 100. One difference, however, between transceiver 101 and transceiver 100 is that transceiver 101 is configured for coupling to the host device via a parallel interface. Thus, SERDES circuits for serializing and de-serializing data between the host device and transceiver 101 are omitted.

Some embodiments of the present invention described above include optoelectronic transceivers that have one datapath for in-bound network traffic and another datapath for out-bound network traffic. But the present invention is not limited to transceivers. Rather, embodiments of the present invention include optoelectronic transmitters and optoelectronic receivers that are capable of participating in "in-band" communication.

Figure 9:
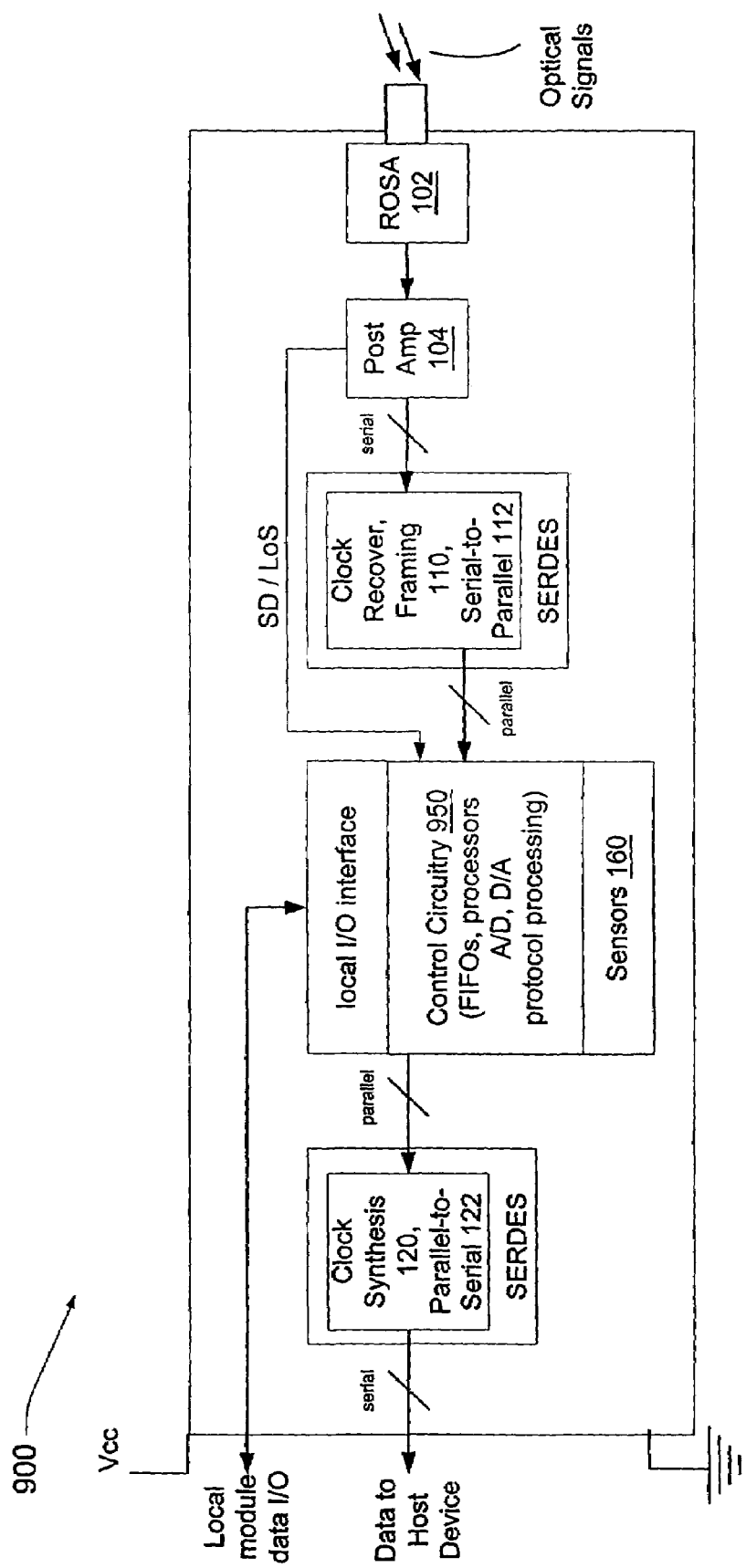
FIG. 9 is a block diagram depicting an optoelectronic transmitter in accordance with another embodiment of the invention.
Figure 10:
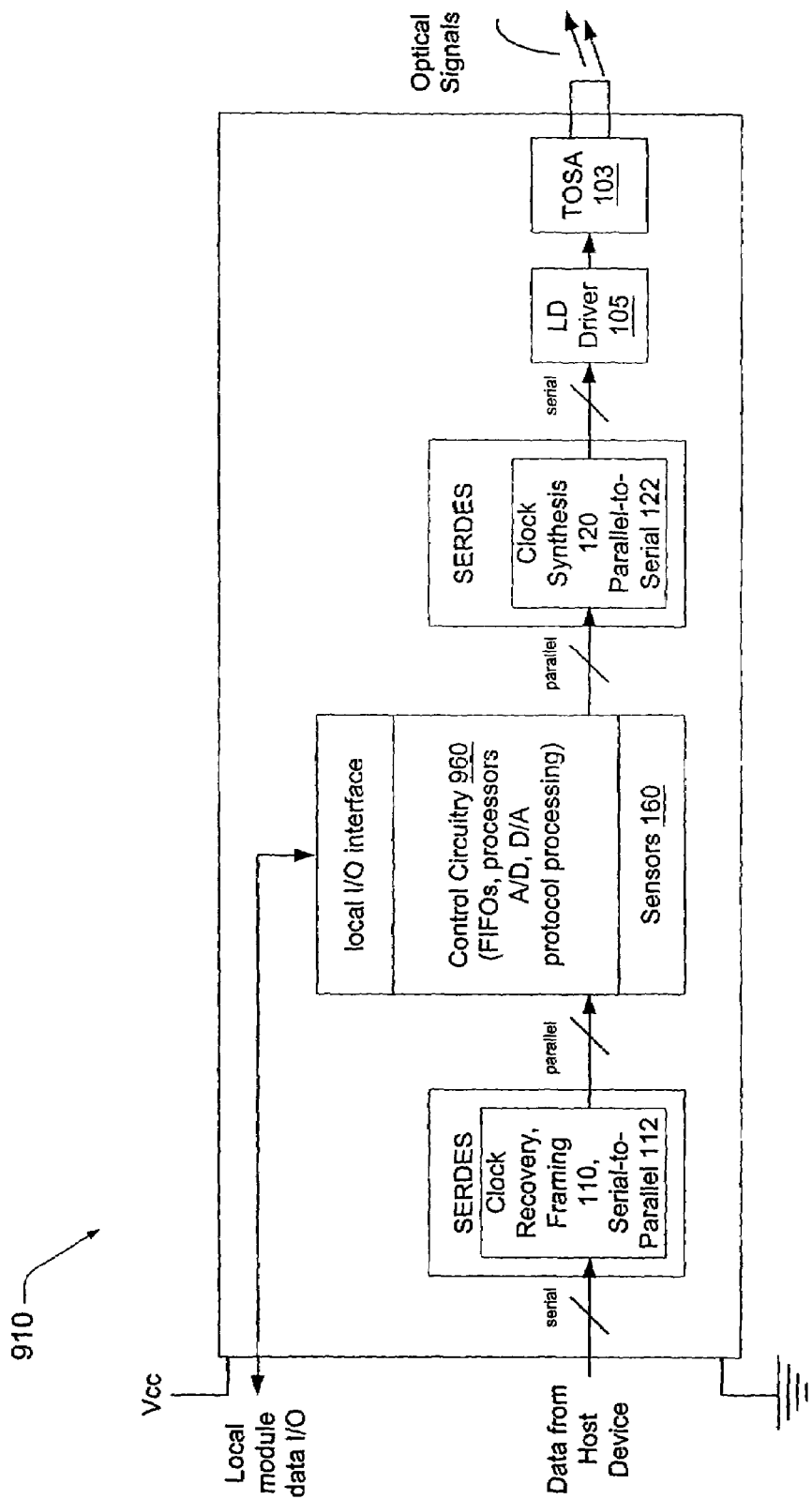
FIG. 10 is a block diagram depicting an optoelectronic receiver in accordance with another embodiment of the invention.
Figure 2A:
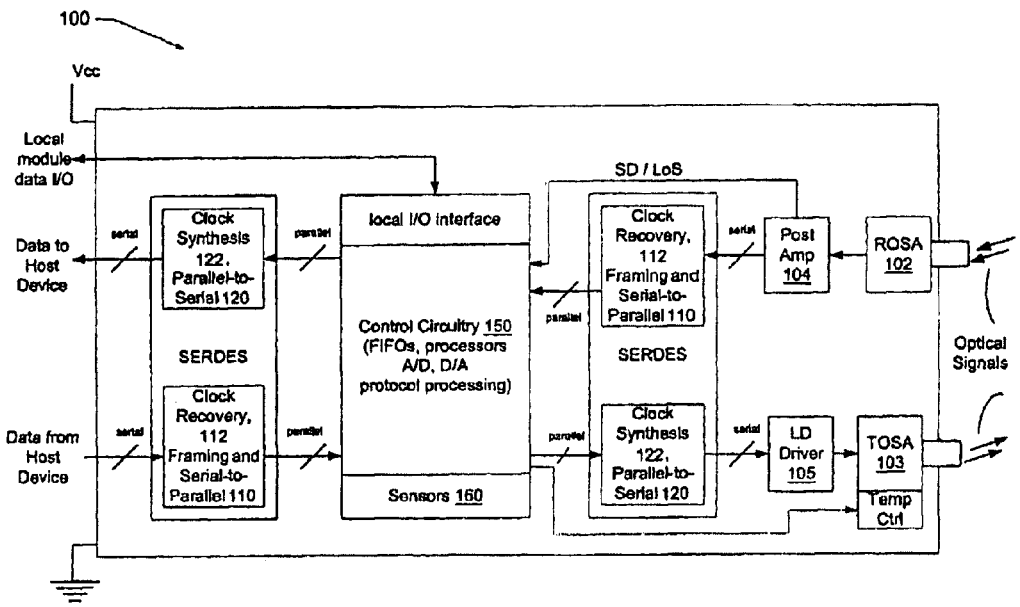
Figure 3A:
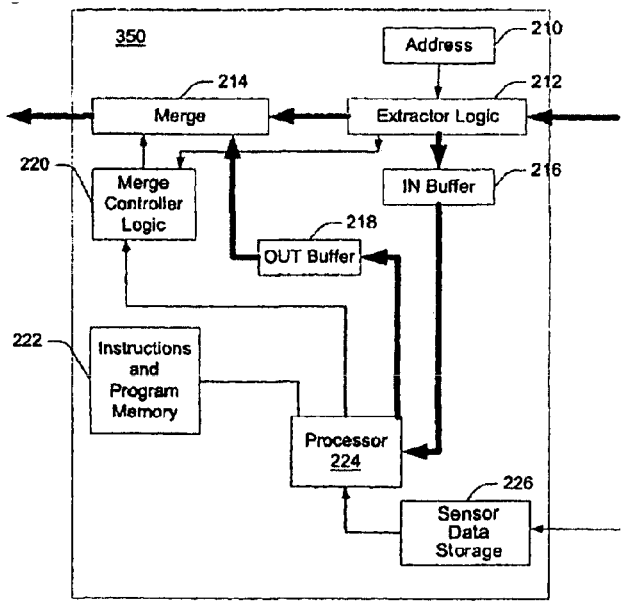

FIG. 9 is a block diagram depicting an optoelectronic receiver 900 in accordance with another embodiment of the invention, and FIG. 10 is a block diagram depicting an optoelectronic transmitter 910 in accordance with another embodiment of the invention. Implementation of optoelectronic receiver 900 and optoelectronic transmitter 910 is substantially similar to that of transceiver 100. A difference, however, is that transmitter 900 is not configured to receive optical signals, and that receiver 910 is not configured to transmit optical signals.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic transceiver, comprising:
    an electrical interface configured to receive a first data stream;
    a laser transmitter;
    a photodiode receiver configured to receive a second data stream; and
    circuitry, comprising:
        analog to digital conversion circuitry for receiving a plurality of analog signals from the laser transmitter and photodiode receiver, converting the received analog signals into digital values, and storing the digital values in predefined locations within a memory; and
        a status transmitter for reading from the memory and adding status information corresponding to a plurality of the digital values stored in the memory to the first data stream to produce a modified first data stream.

2. The transceiver of claim 1, wherein the laser transmitter transmits the modified first data stream.

3. A method of operating an optoelectronic transceiver having an electrical interface to receive a first data stream and a photodiode receiver to receive a second data stream, comprising:
    within the optoelectronic transceiver, receiving a plurality of analog signals from the laser transmitter and photodiode receiver, converting the received analog signals into digital values, and storing the digital values in predefined locations within a memory; and
    within the optoelectronic transceiver, reading from the memory and adding status information corresponding to a plurality of the digital values stored in the memory to the first data stream to produce a modified first data stream.

4. The method of claim 3, further comprising transmitting the modified first data stream using a laser transmitter.

5. An optoelectronic transceiver, comprising:
    an electrical interface configured to receive a first data stream;
    a laser transmitter;
    a photodiode receiver configured to receive a second data stream; and
    circuitry, comprising:
        memory, including one or more memory arrays for storing information related to the transceiver;
        analog to digital conversion circuitry for receiving a plurality of analog signals from the laser transmitter and photodiode receiver, converting the received analog signals into digital values, and storing the digital values in predefined locations within the memory; and
        a status transmitter for reading from the memory and adding status information corresponding to a plurality of the digital values stored in the memory to the second data stream to produce a modified second data stream.

6. The transceiver of claim 5, wherein the electric interface transmits the modified second data stream.

7. A method of operating an optoelectronic transceiver having an electrical interface to receive a first data stream and a photodiode receiver to receive a second data stream, comprising:
   within the optoelectronic transceiver, receiving a plurality of analog signals from the laser transmitter and photodiode receiver, converting the received analog signals into digital values, and storing the digital values in predefined locations within a memory; and
   within the optoelectronic transceiver, reading from the memory and adding status information corresponding to a plurality of the digital values stored in the memory to the second data stream to produce a modified second data stream.

8. The method of claim 7, further comprising transmitting the modified second data stream using the electrical interface.

9. An optoelectronic device selected from one of an optoelectronic transceiver, an optoelectronic transmitter and an optoelectronic receiver, the device comprising:
   a first interface configured to receive a first data stream that comprises data packets;
   a circuit that modifies the first data stream to generate a second data stream, the second data stream including at least a subset of the data packets in the first data stream;
   the circuit further configured to insert data packets containing status information into the first data stream to generate the second data stream; and
   a second interface configured to output the second data stream.

10. The optoelectronic device of claim 9, wherein the first interface is an electrical interface and the second interface is an optical interface.

11. A method of operating an optoelectronic device having a first interface, a circuit and a second interface comprising:
   receiving a first data stream that comprises data packets;
   modifying the first data stream to generate a second data stream, including inserting data packets containing status information into the first data stream to generate the second data stream; and
   outputting the second data stream.

12. The method of claim 11, including receiving the first data stream at the first interface and outputting the second data stream at the second interface, wherein the first interface is an electrical interface and the second interface is an optical interface.

13. The method of claim 11, including receiving the first data stream at the second interface and outputting the second data stream at the first interface, wherein the first interface is an electrical interface and the second interface is an optical interface.

\* \* \* \* \*

UNITED STATES PATENT AND TRADEMARK OFFICE
CERTIFICATE OF CORRECTION

PATENT NO. : 7,332,234 B2
APPLICATION NO. : 11/231559
DATED : February 19, 2008
INVENTOR(S) : Levinson et al.

It is certified that error appears in the above-identified patent and that said Letters Patent is hereby corrected as shown below:

Title Page
Item 56, References Cited, U.S. Patent Documents, Page 2, change "2004/0153931" to --2004/0153913--
Item 57, Abstract, change "IF address)" to --IP address)--

Figure 1:
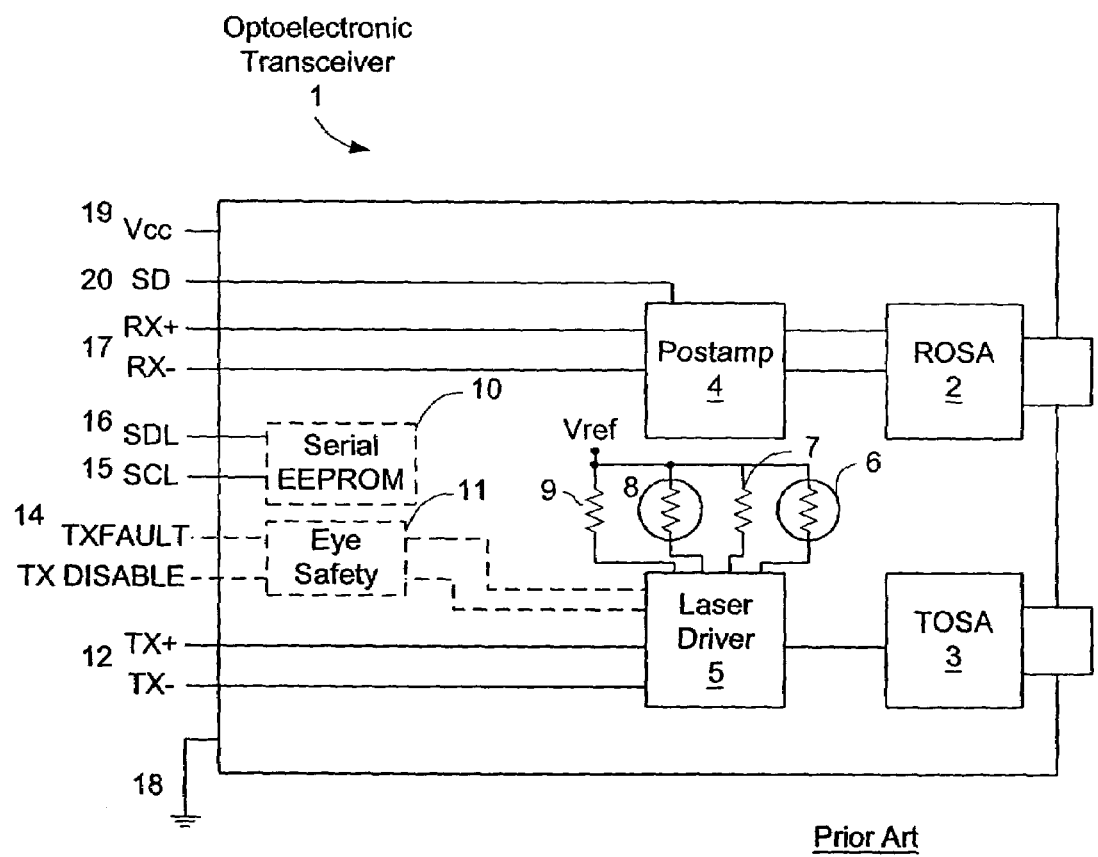
FIG. 1 is a block diagram depicting a prior-art optoelectronic transceiver.

Drawings
Replace Figure 1 with the figure depicted below, wherein TX disable pin is labeled 13

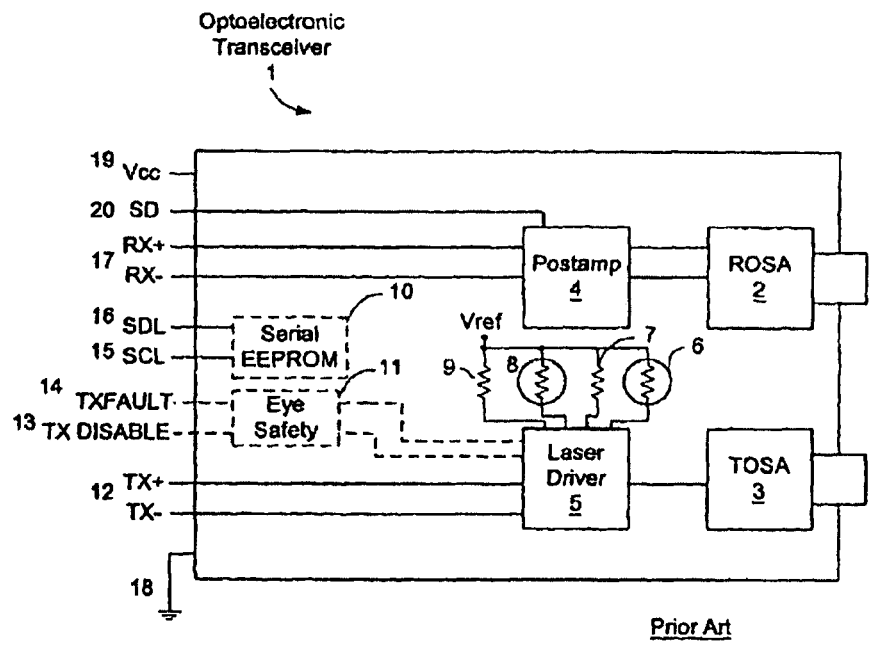

Fig. 1

Signed and Sealed this

Twenty-sixth Day of October, 2010

David J. Kappos
*Director of the United States Patent and Trademark Office*

Replace Figure 2A with the figure depicted below, wherein the Clock Recovery is relabeled 112, Framing and Serial-to-Parallel is relabeled 110, Parallel-to-Serial is relabeled 120, and Clock Synthesis is relabeled 122

Replace Figure 3A with the figure depicted below, wherein the "Status Memory" is renamed as "Sensor Data Store"

CERTIFICATE OF CORRECTION (continued)
U.S. Pat. No. 7,332,234 B2

Replace Figure 3B with the figure depicted below, wherein the "Status Memory" is renamed as "Sensor Data Storage" and label 232 for Address (from 210) transfer is removed

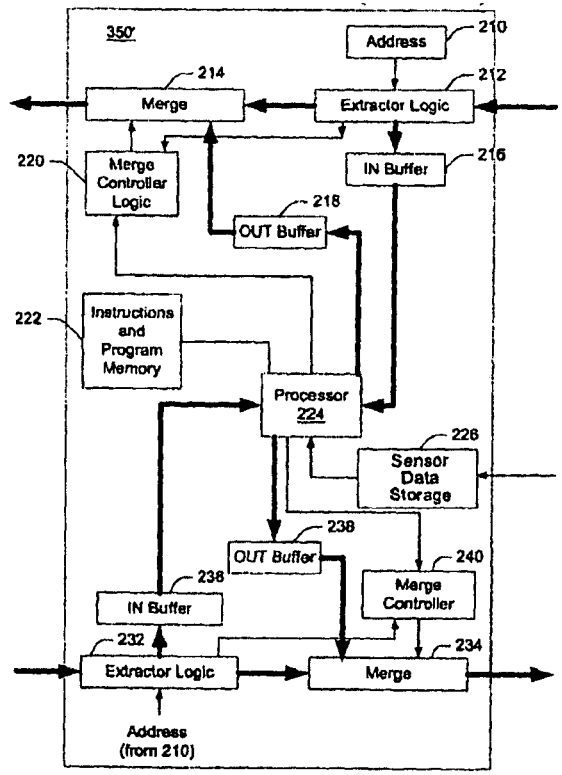

Fig. 3B

Replace Figure 5 with the figure depicted below, wherein Extractor Circuit is labeled 212 and Out Buffer is labeled 218

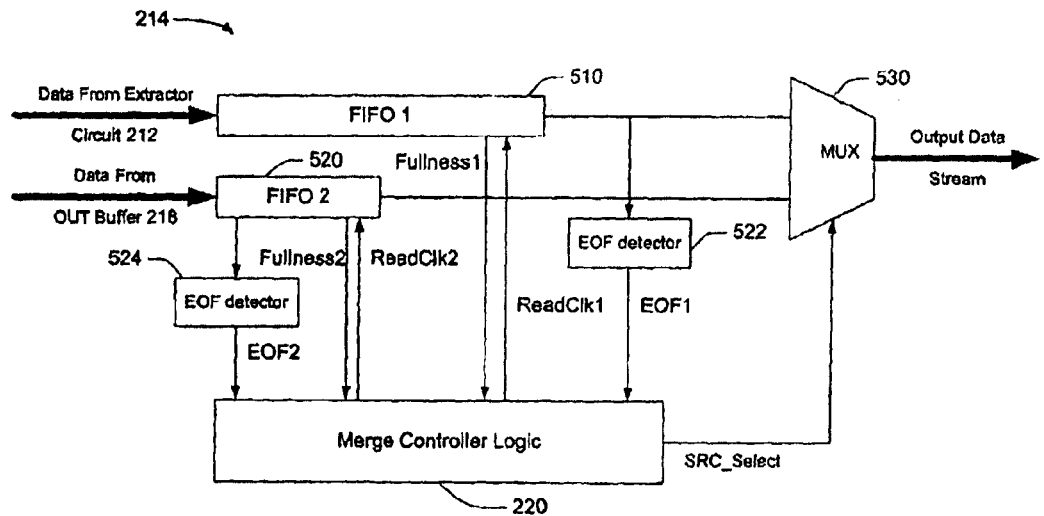

Fig. 5

Replace Figure 9 with the figure depicted below, wherein the Clock Recovery is relabeled 112, Framing and Serial-to-Parallel is relabeled 110, Parallel-to-Serial is relabeled 120, and Clock Synthesis is relabeled 122

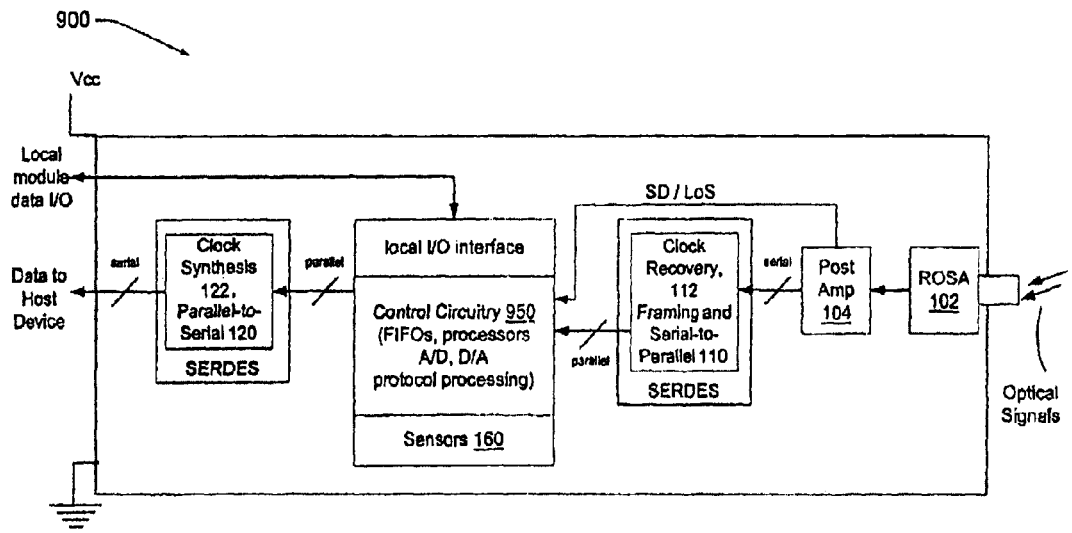

Fig. 9

Replace Figure 10 with the figure depicted below, wherein the Clock Recovery is relabeled 112, Framing and Serial-to-Parallel is relabeled 110, Parallel-to-Serial is relabeled 120, and Clock Synthesis is relabeled 122

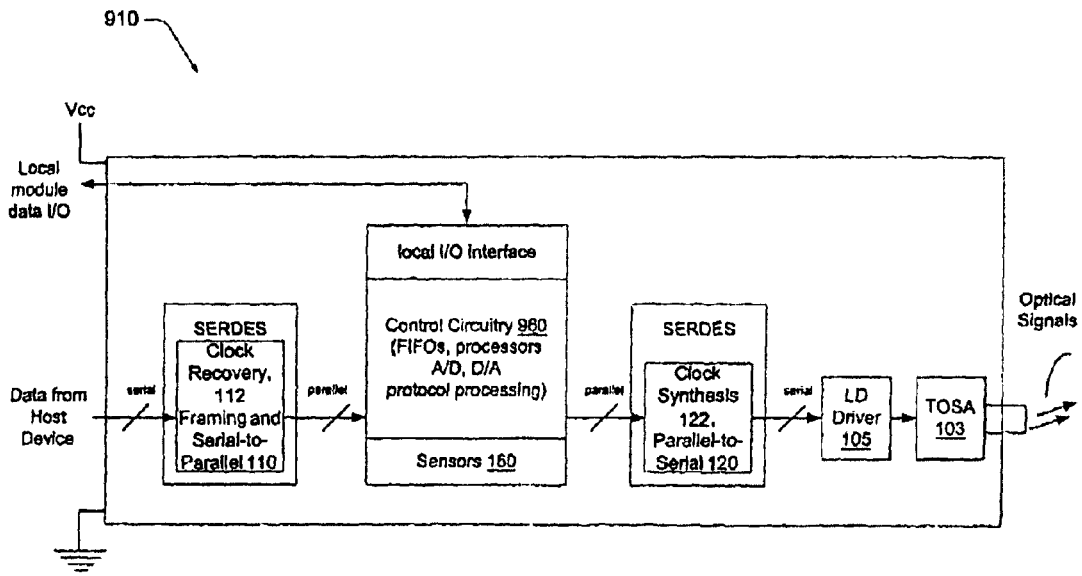

Fig. 10

Column 1
Line 33, after "ROSA", add [2]
Line 37, after "postamp circuit", add [4]
Line 43, after "TOSA", add [3]
Line 46, after "driver", add [5]
Line 55, after "circuit", add [5]

Column 2
Line 67, after "local module", remove [110]

Column 6
Line 51, after "transceiver", add [100]
Line 53, after "transceiver", add [100]
Line 56, after "transceiver", add [100]
Line 58, after "transceiver", add [100]

Column 7
Line 24, change "(I/0 interface" to --(I/O interface--
Line 54, change "transceiver 100)," to --transceiver 100, see FIG. 2A),--

Column 8
Line 18, after "150", add [(see FIG. 2A)]
Line 19, after "150", add [(see FIG. 2A)]
Line 42, after "160", add [(see FIG. 2A)]
Line 42, after "transceiver", add [100 (see FIG. 2A)]
Line 61, change "220" to --222--

Column 9
Line 35, change "and merge circuit 240." to --merge circuit 234, and merge circuit controller 240.--
Line 43, change "anyone" to --any one--

Column 10
Line 18, change "FIFO" to --FIFO1--
Line 19, change "circuit 510, and FIFO 520" to --circuit 212, and FIFO2 520--
Line 21, change "are" to --is--
Line 27, after "FIFO2", add [520]
Line 27, change "FIFO 1" to --FIFO1 510--
Line 29, change "FIFO 1" to --FIFO1 510--
Line 30, after "FIFO1", add [510]
Line 31, after "FIFO2", add [520]
Line 32, change "FIFO 1" to --FIFO1 510--
Line 41, change "316" to --220--
Line 42, after "FIFO1", add [510]
Line 43, change "316" to --220--
Line 44, after "FIFO2", add [520]
Line 45, change "FIFO 510 or FIFO 520," to --FIFO1 510 or FIFO2 520,--
Line 49, change "FIFO1 or FIFO2," to --FIFO1 510 or FIFO2 520,--

Column 10
Line 54, change "FIFO 510" to --FIFO1 510--
Line 55, change "FIFO 520." to --FIFO2 520.--
Line 57, after "FIFO1", add [510]
Line 60, after "FIFO1", add [510]
Line 62, change "316" to --220--
Line 62, change "FIFO 1" to --FIFO1 510--
Line 64, after "FIFO2", add [520]
Line 65, after "FIFO2", add [520]
Line 66, after "FIFO2", add [520]
Line 67, change "316" to --220--

Column 11
Line 1, after "FIFO1", add [510]
Line 2, after "FIFO2", add [520]
Line 3, change "FIFO1 and FIFO2," to --FIFO1 510 and FIFO2 520,--
Line 24, after "150", add [(see FIG. 2A)]
Line 29, change "103)" to --103 see FIG. 2A)--
Line 35, after "100", add [(see FIG. 2A)]
Line 55, after "100", add [(see FIG. 2A)]
Line 56, change "receive" to --transmit--
Line 58, change "transmit" to --receive--